United States Patent
Shiraishi et al.

(10) Patent No.: US 8,657,477 B2
(45) Date of Patent: Feb. 25, 2014

(54) ILLUMINATION UNIT AND DISPLAY APPARATUS USING THE SAME

(75) Inventors: Mikio Shiraishi, Yokohama (JP); Masayuki Tanabe, Fujisawa (JP); Mika Tanimura, Yokohama (JP); Shoji Yamamoto, Fujisawa (JP); Kenji Takano, Nagaoka (JP); Yoshifumi Shimane, Machida (JP); Yasuaki Ohara, Yokohama (JP); Reiji Nakamura, Ichinomiya (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 6 days.

(21) Appl. No.: 13/566,673

(22) Filed: Aug. 3, 2012

(65) Prior Publication Data

US 2013/0051064 A1    Feb. 28, 2013

(30) Foreign Application Priority Data

Aug. 26, 2011    (JP) ................. 2011-184274

(51) Int. Cl.
  *G09F 13/18*    (2006.01)
(52) U.S. Cl.
  USPC .......... 362/602; 362/606; 362/612; 362/97.1; 362/97.3; 362/619
(58) Field of Classification Search
  USPC ............. 362/602, 612, 613, 97.1–97.3, 619
  See application file for complete search history.

(56) References Cited

U.S. PATENT DOCUMENTS

| 7,324,174 B2 * | 1/2008 | Hafuka et al. ............. 349/61 |
| 2006/0215386 A1 | 9/2006 | Hatanaka et al. |
| 2008/0192504 A1 * | 8/2008 | Chou ..................... 362/612 |
| 2012/0026753 A1 | 2/2012 | Shiraishi et al. |

FOREIGN PATENT DOCUMENTS

| JP | 06-174929 | 6/1994 |
| JP | 2001-042327 | 2/2001 |
| JP | 2003-242817 | 8/2003 |
| JP | 2005-117023 A | 4/2005 |
| JP | 2005-347010 A | 12/2005 |
| JP | 2012-033420 A | 2/2012 |

* cited by examiner

*Primary Examiner* — Anabel Ton
(74) *Attorney, Agent, or Firm* — Foley & Lardner LLP

(57) ABSTRACT

An illumination unit includes LEDs and a tabular light guide plate having a light emitting surface for emitting light from the LEDs as planar light, wherein a recessed portion is formed in the opposite surface of the light emitting surface of the light guide plate, and the LED is provided in the recessed portion so that the optical axis of the LED becomes parallel to the light emitting surface of the light guide plate. Here, a dimming pattern is provided at a location corresponding to the LED of the light emitting surface of the light guide plate, and furthermore a first light guide pattern is provided on the light emitting surface of the light guide plate and a second light guide pattern is provided on a rear surface that is a reflective surface.

11 Claims, 13 Drawing Sheets

(a)　　　　　　(b)

ILLUMINATION UNIT AND DISPLAY APPARATUS USING THE SAME

INCORPORATION BY REFERENCE

The present application claims priority from Japanese application JP2011-184274 filed on Aug. 26, 2011, the content of which is hereby incorporated by reference into this application. The contents of Japanese applications JP2011-184273 filed on Aug. 26, 2011 and JP2011-184271 filed on Aug. 26, 2011 are also hereby incorporated by reference into this application.

BACKGROUND OF THE INVENTION

The present invention relates to an illumination unit using LEDs (Light Emitting Diodes) as a light source, and to a display apparatus using the same as a back light.

The illumination unit using an LED, i.e., a light emitting element, as a light source is used as a back light of a display apparatus with a transmission type display device, such as a liquid crystal display panel (LCD), and is widely put into practical use.

As the configuration of the illumination unit used as a back light, a configuration using an LED as a light source and a light guide plate for guiding the light emitted from the LED to an LCD side as a surface light source is known.

In such configuration, the light incoming from the light source travels inside the light guide plate by total internal reflection or the like, and is scattered by a diffusion/light guide pattern provided on the surface of the light guide plate, and is extracted from the surface of the light guide plate. At this time, in the vicinity of the light source (the vicinity of the light incident portion) of the light guide plate, the intensity of light locally increases as compared with other portions and the so-called uneven brightness is generated. As a conventional art for reducing such uneven brightness, it is known that a light shielding member or a light reflective/absorbing member is provided in the vicinity of a light source of the surface of a light guide plate, as described, for example, in JP-A-2005-117023 and JP-A-2003-242817.

It is known that a predetermined pattern is provided in a reflective plate provided on the surface of a light guide plate (on a light emitting surface and/or a rear surface) or on the rear side of the light guide plate in order to uniform a spatial brightness distribution of light exiting from the light emitting surface of the light guide plate, as in JP-A-2005-347010, JP-A-6-174929, and JP-A-2001-42327, for example.

SUMMARY OF THE INVENTION

In the display apparatus of a recent television apparatus or the like, there is a need for increasing the screen size, and furthermore saving power consumption and increasing picture quality. In order to realize the power-saving and high quality picture in the display apparatus with a large screen, the so-called areal control (local dimming) is carried out, wherein the entire screen of the display apparatus is divided, and furthermore, the irradiation surface of an illumination unit is divided into a plurality of regions corresponding to the divided screens, and wherein the light intensity of each region of the illumination unit is individually controlled corresponding to an image of the divided screen. Here, the region is the minimum unit for controlling light and is virtual, and thus does not need to be physically divided.

In the configuration of such illumination unit having a plurality of regions, with the pattern in the conventional art described above, the uneven brightness between regions of the illumination unit may not be fully suppressed. That is, the conventional art does not take fully into consideration the suppression of the uneven brightness when the illumination unit is divided into a plurality of regions.

Moreover, an LED has a light emission characteristic that light radially spreads around the center (optical axis) of its lighting surface. Here, the optical axis is an axis extending from the center of the light emitting surface of an LED to a direction perpendicular to the light emitting surface. For example, in the case where an LED is a side view type LED whose light emitting direction is parallel to an electrode surface, when this side view type LED is seen from above (from the upper side), light is emitted so as to radially spread, around the optical axis, forwardly from the lighting surface side.

In the above-described conventional art, the light shielding member or the light reflective/absorbing member provided in the light guide plate does not have a configuration taking into consideration the above-described light emission characteristic of the LED. Therefore, in the conventional art, it is difficult to suitably reduce such uneven brightness that the light intensity locally increases in the vicinity of an LED as described above, i.e., the uneven brightness in one region.

The present invention has been made in view of the above-described problem of the conventional art, and provide, in an illumination unit using an LED as a light source and being divided into a plurality of regions and a display apparatus using the same, a technique suitable in reducing the uneven brightness between regions and the uneven brightness within a region.

The present invention is characterized by the configurations as set forth in the claims.

More specifically, according to an aspect of the present invention, an illumination unit comprises: light emitting elements (LEDs) as a light source; and a tabular light guide plate having a light emitting surface for emitting light from the light source as planar light, wherein a recessed portion is formed in an opposite surface of the light emitting surface of the light guide plate, and wherein the light emitting element is provided in the recessed portion so that an optical axis of the light emitting element becomes parallel to the light emitting surface of the light guide plate. Here, a dimming pattern is provided at a portion positionally corresponding to the light emitting element of the light emitting surface of the light guide plate, a first light guide pattern is provided on the light emitting surface of the light guide plate, and a second light guide pattern is provided on a rear surface of the light guide plate.

The dimming pattern on the light emitting surface side of the above-described light guide plate is provided separately from the first light guide pattern, and the dimming pattern and the first and second light guide patterns are formed by printing, respectively.

According to the present invention, both the uneven brightness between regions and the uneven brightness within a region can be suitably reduced.

Other objects, features and advantages of the invention will become apparent from the following description of the embodiments of the invention taken in conjunction with the accompanying drawings.

DETAILED DESCRIPTION OF THE EMBODIMENTS

Figure 1:
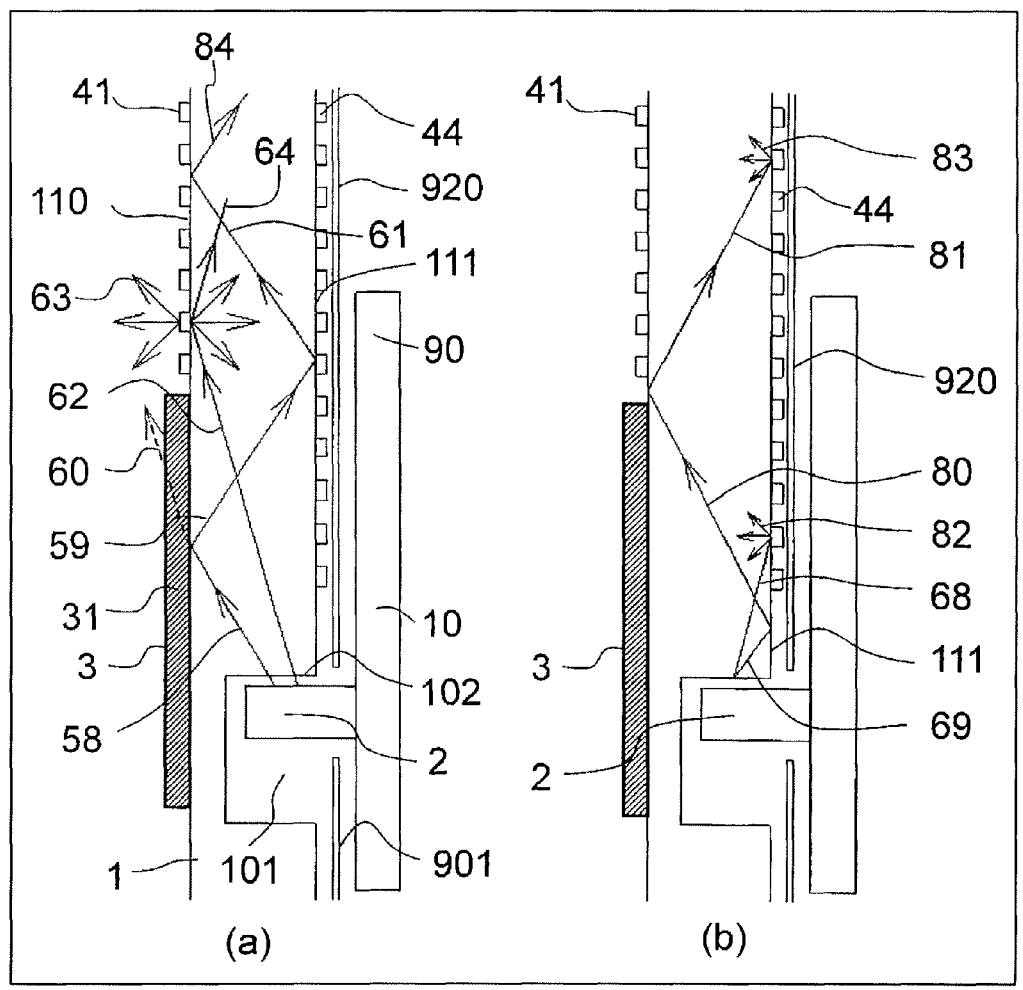
FIG. 1 is a view illustrating a dimming pattern portion and its periphery according to a first embodiment of the present invention.

Hereinafter, the embodiments of the present invention will be described with reference to the accompanying drawings. Note that, in each view or each embodiment, the same reference numeral is attached to an element having the same configuration, function, or effect, and repeated explanation thereof is omitted.

Embodiment 1

FIG. 1 is a view for illustrating an optical effect of a light guide plate 1 according to a first embodiment of the present invention. The embodiment is characterized in that a dimming pattern with a radial protrusion, e.g., a chestnut-shaped dimming pattern, is provided at a portion positionally corresponding to an LED 2 (provided directly above an LED 2) of a light emitting surface 110 of the light guide plate 1 that converts the light from the LED 2, i.e., a light emitting element, to a planar light and emits the same, and furthermore in that an emission-surface side light guide pattern 41 that is a first light guide pattern is provided on a light emitting surface 110 of the light guide plate 1, and a reflective-surface side light guide pattern 44 that is a second light guide pattern is provided on a rear surface (reflective surface) 111 of the light guide plate 1. The detail of the embodiment is described later. First, the detailed description of a display apparatus and an illumination unit, to which the embodiment is applied, is provided using FIG. 2 to FIG. 6.

Figure 2:
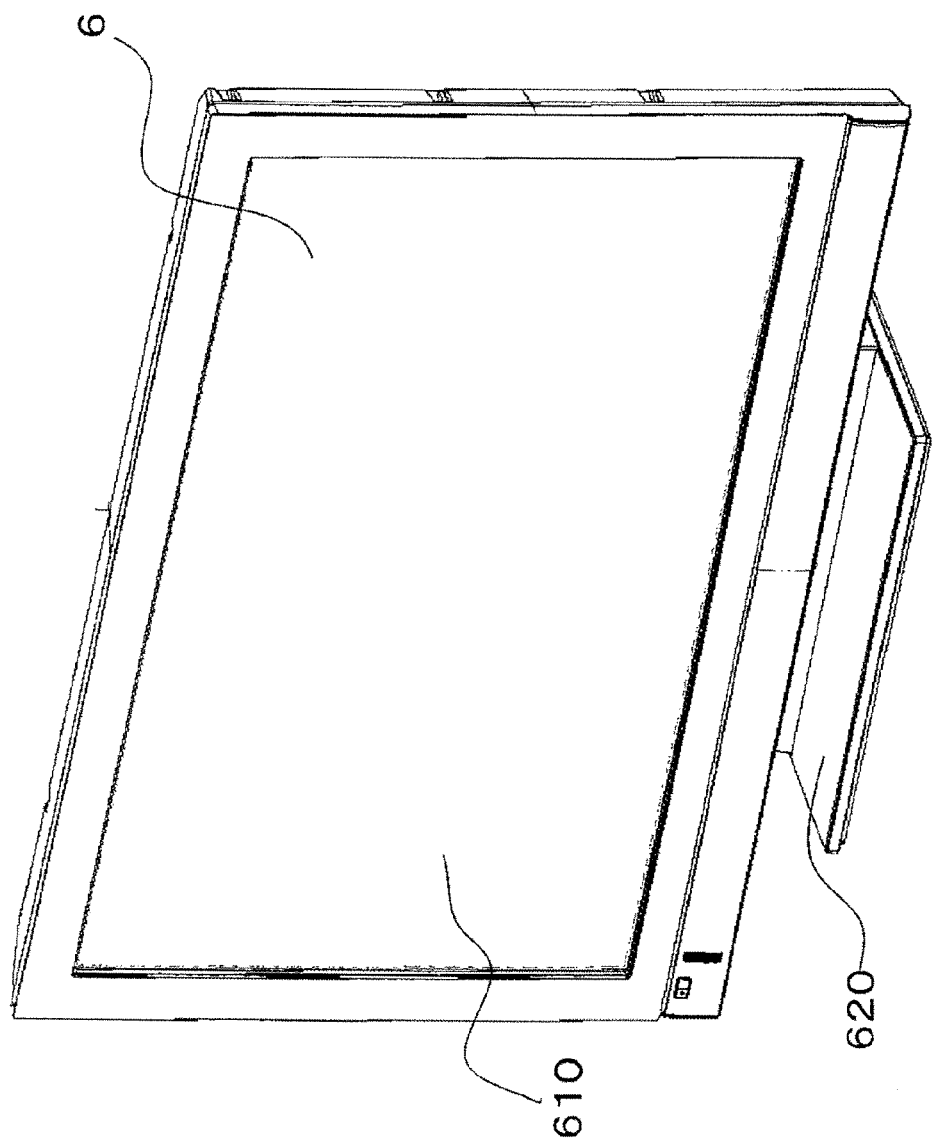
FIG. 2 is a perspective view illustrating an exemplary external view of a display apparatus 6 to which the present invention is applied.

FIG. 2 is a perspective view illustrating an exemplary external view of a display apparatus to which the present invention is applied. In FIG. 2, as an example of the display apparatus, a form of a television set is taken as an example.

In FIG. 2, the display apparatus 6 is a liquid crystal display apparatus using a liquid crystal display panel, and comprises a display unit 610 and a stand unit 620 supporting the display unit 610 from thereunder. Inside the display unit 610, as described later, the liquid crystal display panel that is a display device and an illumination unit are provided.

Figure 3:
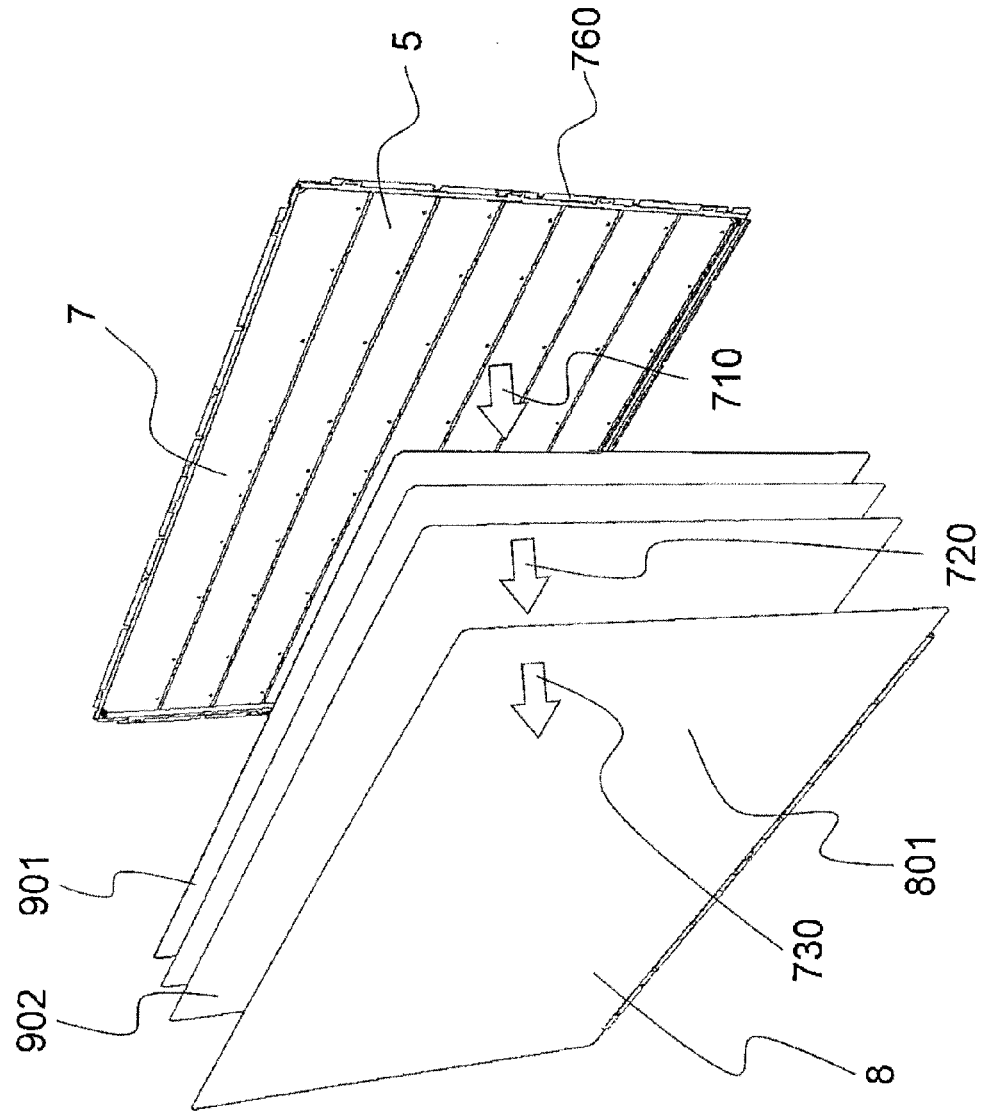
FIG. 3 is an exploded perspective view illustrating an example of the arrangement of main components in a display unit 610 shown in FIG. 2.

FIG. 3 is an exploded perspective view illustrating an example of the arrangement of main components in the display unit 610 of the display apparatus 6 illustrated in FIG. 2.

In FIG. 3, the main parts constituting the display apparatus 6 are a liquid crystal display panel (liquid crystal cell) 8 and an illumination unit 7 that is a back light for irradiating light from the rear surface of the liquid crystal display panel 8. Here, light exiting from the illumination unit 7 travels as shown by an arrow 710, and reaches the liquid crystal display panel 8 through a diffuser 901, a prism sheet 902, and the like as shown by an arrow 720. A video signal is supplied to the liquid crystal display panel 8, and the light transmittance of a liquid crystal element constituting each pixel is controlled based on this video signal. Then, light that is incident upon the liquid crystal display panel 8 as shown by the arrow 720 is spatially modulated by each pixel of the liquid crystal display panel 8 to form an optical image, which is displayed on a light emitting surface 801 as an image. That is, light incident upon the liquid crystal display panel 8 is emitted as image light as shown by an arrow 730.

The illumination unit 7 comprises a single sub-illumination unit 5 or a combination of a plurality of sub-illumination units 5, and is attached to a lower chassis 760 constituting the whole illumination unit 7 and held.

The internal configuration of the sub-illumination unit 5 continues to be described with reference to FIG. 4. In (a) of FIG. 4, a plurality of LEDs 2 are attached to the light guide plate 1 via the illumination board 10 so as to be arranged with a predetermined spacing along a predetermined direction. Here, the LED 2 is provided so that the light emitting direction thereof becomes a direction parallel to the light emitting surface 110 of the light guide plate 1, i.e., so that the optical axis of the LED 2 becomes parallel to the light emitting surface 110 of the light guide plate 1. Light emitted from the LED 2 is incident upon a light incident surface 102 of the light guide plate 1 and travels inside the light guide plate 1, and is appropriately radiated from the light emitting surface 110 of the light guide plate 1, and reaches the liquid-crystal panel cell 8 via the diffuser 901, the prism sheet 902, and the like. Here, in the embodiment, the LED 2 is a side view type LED, and emits white light. With the use of the side view type LED, just by attaching the LED 2 to the illumination board 10, the light emitting direction of the LED 2 becomes a direction parallel to the light emitting surface 110 of the light guide plate 1.

In the embodiment, a recessed portion 101 is formed in a surface (hereinafter, in some cases referred to as a rear surface) on the opposite side of the light emitting surface 110 of the light guide plate 1, and the LED 2 is arranged in the recessed portion 101 formed in the rear surface of the light guide plate 1. Here, the recessed portion 101 comprises a groove which, in the embodiment, extends in the horizontal direction (the depth direction of the plane of the figure, equal to the horizontal direction (lateral direction) of the liquid crystal display panel 8) of the light guide plate 1, and therefore, this recessed portion will be hereinafter referred to as a groove portion. This groove portion is formed continuously in the horizontal direction of the light guide plate 1. One side of the groove portion 101 is the light incident surface 102 described above, and light emitted from the LED 2 is captured into the light guide plate 1 from the incidence plane 102 that is one side of the groove portion 101.

Figure 4:
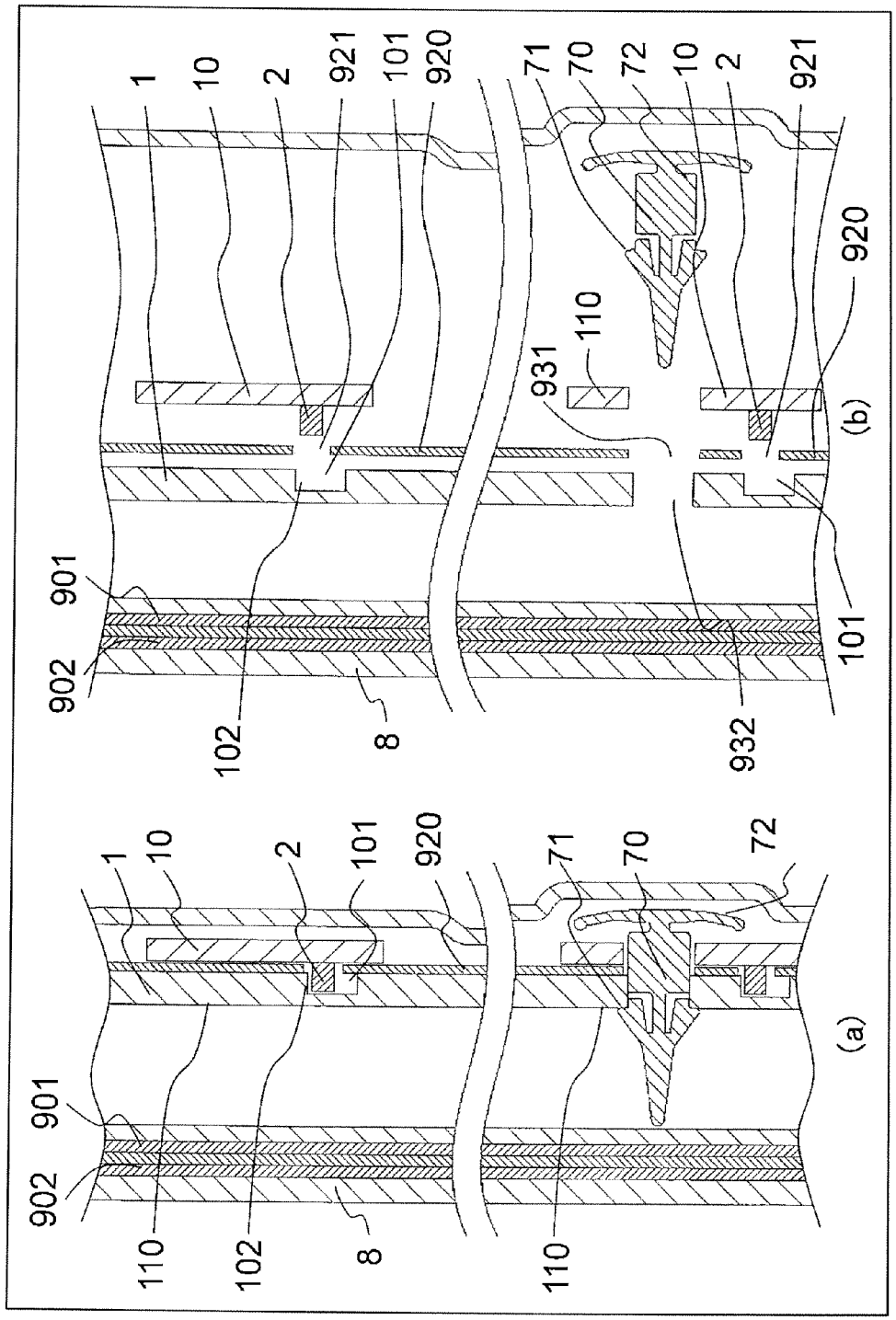
FIG. 4 is a cross sectional view illustrating a configuration example of an illumination unit 5 shown in FIG. 3.

(B) of FIG. 4 illustrates an exploded view of the illumination unit 5. A reflective sheet 920 is provided between the light guide plate 1 and the illumination board 10 on which the LED 2 is mounted. That is, the reflective sheet 920 is sandwiched and held by the rear surface of the light guide plate 1 and the illumination board 10 so as to be arranged on the rear side of the light guide plate 1. By means of the reflective sheet 920, light transmitting through to the outside from the rear side of the light guide plate 1 is reflected and returned into the light guide plate 1. This improves the light use efficiency. Then, the LED 2 is exposed from an LED hole 921 provided in the reflective sheet 920, and the light emission portion of the LED 2 is inserted into the groove portion 101 of the light guide plate 1. A holding structure of the illumination board 10 with respect to the light guide plate 1 is attached using a pin mould 70 projecting in the thickness direction of the light guide plate 1 and having a tapered shape toward the liquid crystal display panel 8 side. In the embodiment, the pin mould 70 comprises resin and has a predetermined elasticity, and furthermore includes a front claw 71 and a back claw 72. Then, the pin mould 70 extends through an illumination board hole 930, a reflective sheet hole 931, and a light guide plate hole 932, and then sandwiches and holds the illumination board 10, the reflective sheet 920, and the light guide plate 1 by the front claw 71 and the back claw 72.

Figure 5:
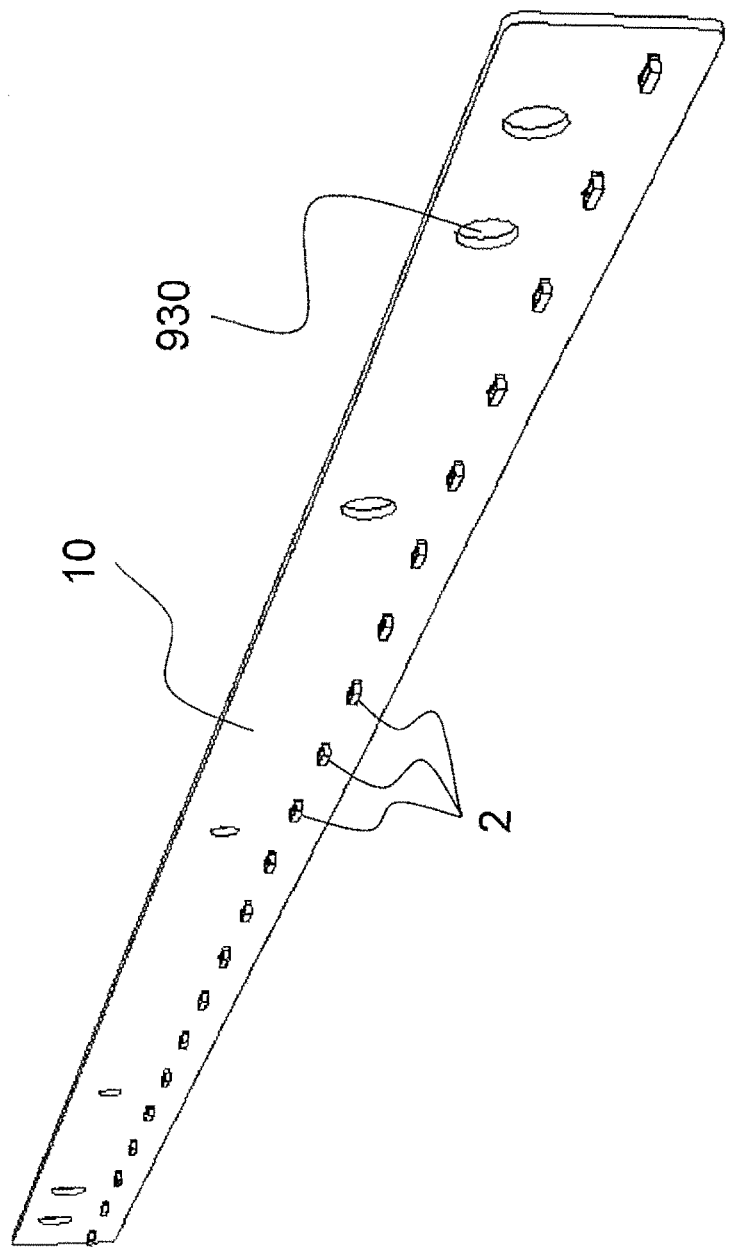
FIG. 5 is a perspective view illustrating a configuration example of an illumination board 10 shown in FIG. 4.

FIG. 5 is a perspective view illustrating a configuration example of the illumination board 10. As illustrated in FIG. 5, the illumination board 10 has a rectangular shape with the horizontal direction of the light guide plate 1 as the longer direction. A plurality of LEDs 2 are arranged with a predetermined spacing along the longer direction of the illumination board 10, and are attached to the illumination board 10 by soldering or the like. Moreover, a plurality of illumination board holes 930 are provided in the illumination board 10, and as with the description of FIG. 4 the pin mould 70 is inserted thereinto and attached and secured to the light guide plate 1.

Figure 6A:
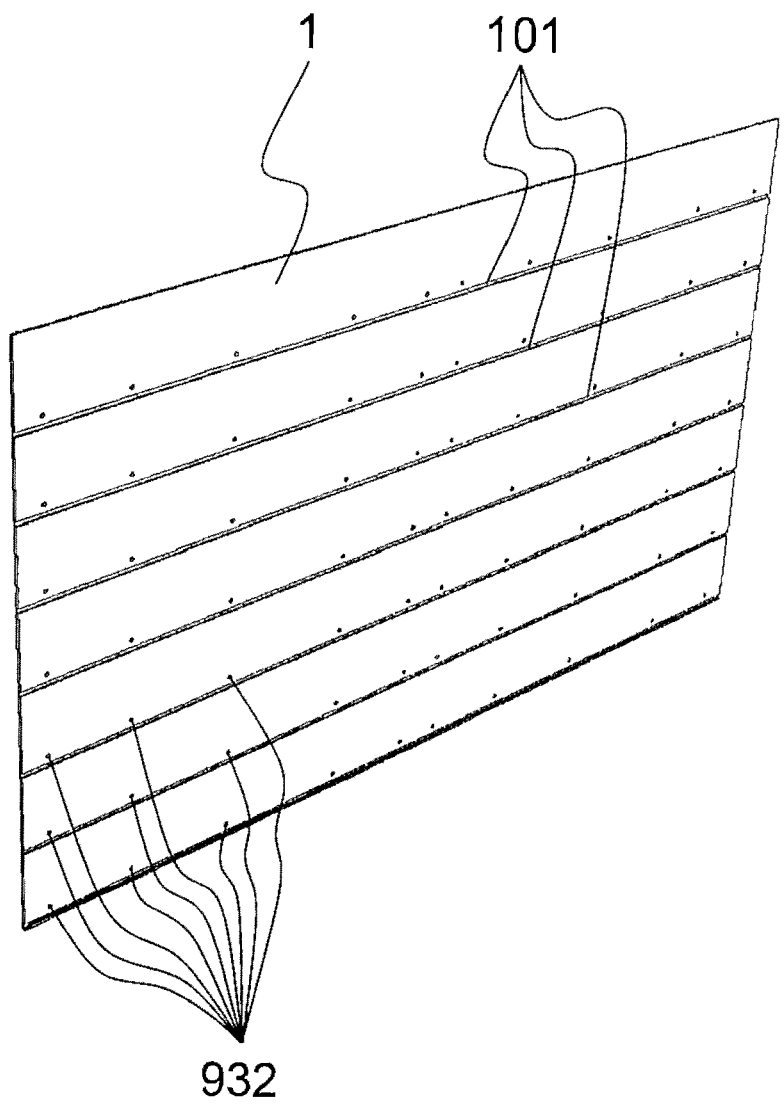
FIGS. 6A and 6B are perspective views illustrating an example of the outer shape of a light guide plate 1 used in an embodiment of the present invention.
Figure 6B:
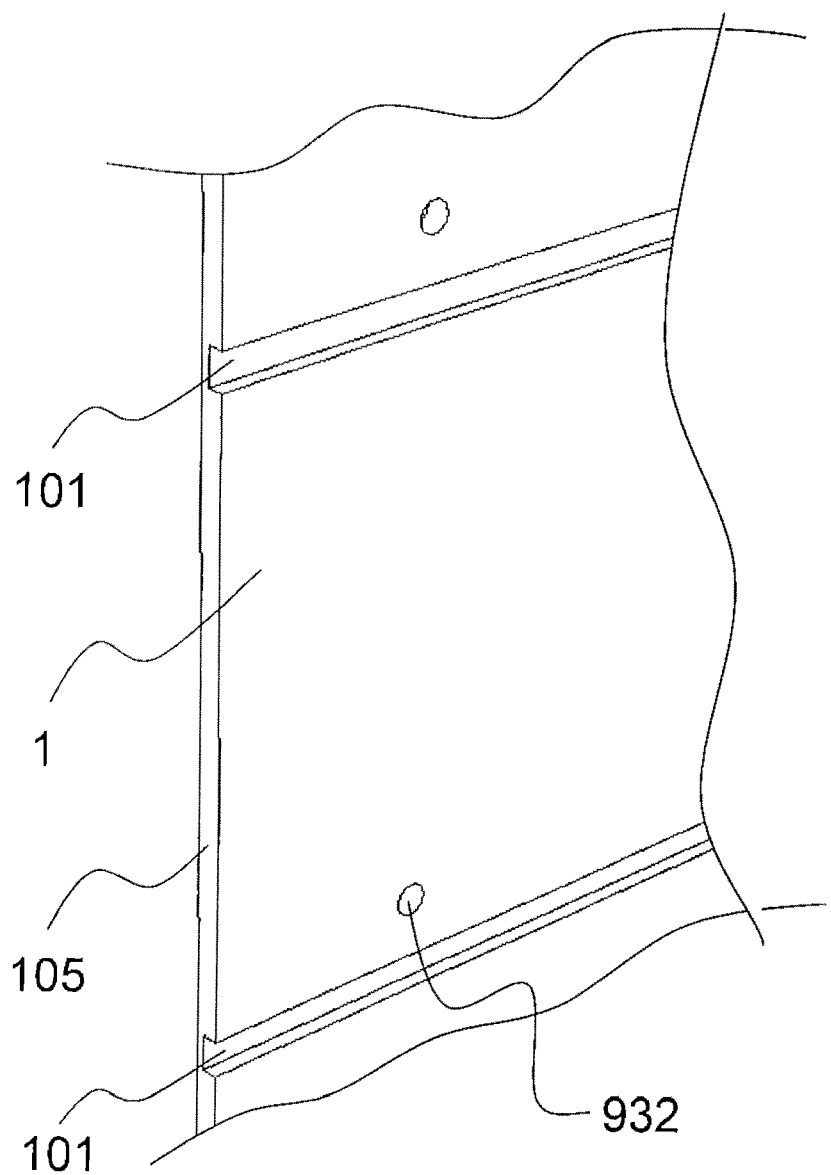

FIGS. 6A and 6B are perspective views illustrating an example of the outer shape of the light guide plate 1 shown in FIG. 1, FIG. 4, and the like. FIG. 6A illustrates the rear side (the side on which the groove portion 101 is formed) of the light guide plate 1, and FIG. 6B illustrates an enlarged view of the end of the light guide plate 1.

As illustrated in FIG. 6A, the light guide plate 1 according to the embodiment comprises one tabular light guide plate having substantially the same size as the display surface of the liquid crystal display panel. Moreover, on the rear side thereof, as illustrated in FIG. 6B, a plurality of groove portions 101, which are formed continuously from one end 105 in the horizontal direction of the light guide plate 1 to the other end, are provided in parallel. In this example, seven groove portions 101 are assumed to be provided. Here, the groove portion 101 is assumed to be formed also in the lowermost end of the light guide plate 1. A plurality of LEDs 2 are inserted into each groove portion 101, and the LEDs 2 of each groove are configured so that the light intensity thereof is individually controlled, respectively. Moreover, a plurality of LEDs 2 inserted into each groove portion 101 are also divided into a plurality of groups. For example, when the number of LEDs inserted into one groove portion 101 is 30, these are divided into 10 groups, each group having three LEDs, and these groups are configured so that LEDs of each group are individually controlled, respectively. Accordingly, in this example, the light guide plate 1 is divided into a total of 70 (virtual) regions of 7×10. This region is the minimum unit in which the intensity of light is controlled, and the light intensity (i.e., the light intensity of LEDs corresponding to each region; the light intensity of three LEDs in this case) of each region is controlled in accordance with the brightness of a video signal corresponding to each region. This enables the so-called areal control (local dimming).

Moreover, a plurality of light guide plate holes 932, into each of which the pin mould 70 for attaching the illumination board 10 is inserted, are provided in the light guide plate 1.

Figure 7:
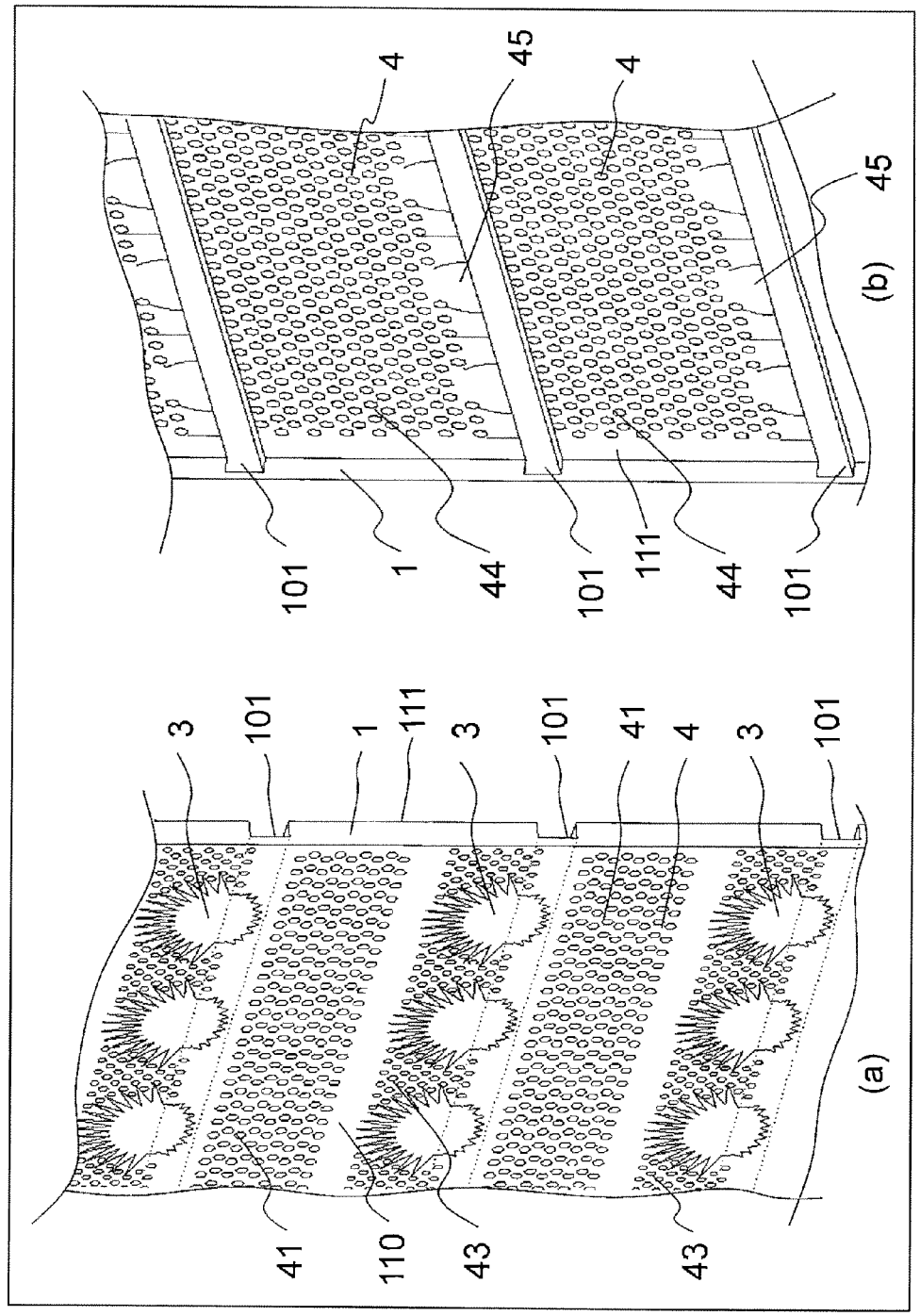
FIG. 7 is a perspective view illustrating an example of the dimming pattern and a light guide pattern formed in a light guide plate according to the first embodiment of the present invention.

FIG. 7 is a view illustrating the configuration on the light emitting surface 110 side and on the rear surface (reflective surface) 111 side of the light guide plate 1, respectively, according to the first embodiment of the present invention. This view aims to illustrate a general form of the light emitting surface 110 and the reflective surface 111 for the purpose of illustrating the schematic configuration, and therefore, the detailed part is simplified and illustrated so as not to obscure the drawing. Accordingly, the shape of the detailed pattern may differ between this view and the detail drawing described later. However, there is no difference in the content and the function, and the component with the same reference numeral has the same function and operation.

As illustrated in (a) of FIG. 7, on the light emitting surface 110 side of the light guide plate 1, there are provide a chestnut-shaped dimming pattern 3, an emission-surface side light guide pattern 41 comprising a collection of micro dots that is a part of the light guide patterns 4, and an emitting-surface side inter-LED light guide pattern 43 comprising a collection of micro dots provided between the LEDs 2. The location of the dimming pattern 3 is set corresponding to the location of the LED 2 housed in the groove portion 101 provided on the light incident surface side of the light guide plate 1. The emitting-surface side inter-LED light guide pattern 43 is formed near the light emitting side between LEDs 2. Moreover, the dimming pattern 3 and the light guide pattern 4 each have different transmittance and light diffusivity, and are provided by printing or the like.

As illustrated in (b) of FIG. 7, in the reflective surface 111 of the light guide plate 1, a reflective-surface side light guide pattern 44 and an reflective-surface side inter-LED light guide pattern 45 that are a part of the light guide pattern 4 are provided. Moreover, the locations of these patterns are set corresponding to the location of the LED 2. The reflective-surface side light guide pattern 44 and the reflective-surface side inter-LED light guide pattern 45 have the same transmittance, reflectance, and diffusivity of light, and are provided by the same process, e.g., by printing or the like, respectively.

Figure 12:
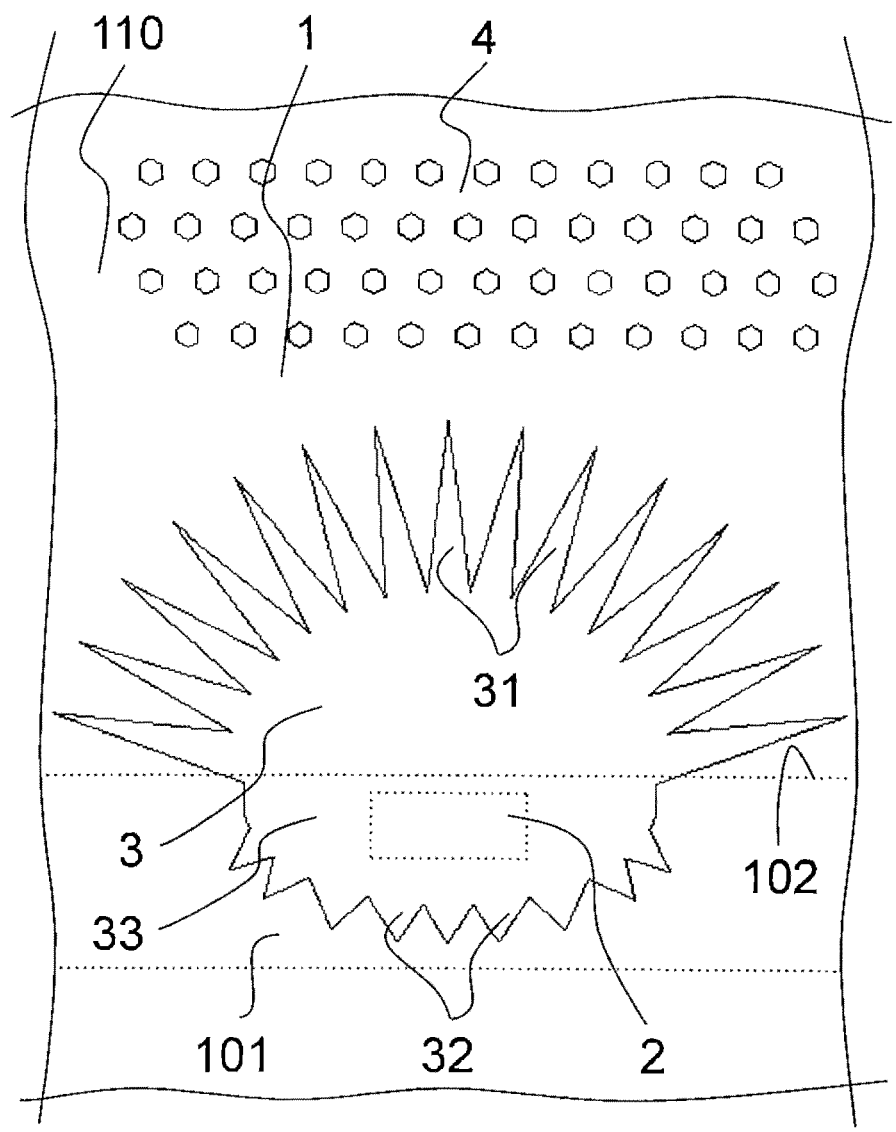
FIG. 12 is a view illustrating an example of the dimming pattern according to the first embodiment.

The detail of each pattern illustrated in FIG. 7 is described below. The dimming pattern 3 is provided at a portion directly above the LED 2 inside the groove portion 101 in the light emitting surface 110 of the light guide plate 1, as illustrated in FIG. 1. The dimming pattern 3 according to the embodiment, as illustrated in FIG. 12, includes: a main portion 33 located directly above the LED 2 and covering the center of the LED 2; a radial emission-side protrusion 31 extending from the center of the LED 2 to the light emitting side of the LED 2; and a radial rear-side protrusion 32 extending to the rear side (the opposite side of the light emitting side) of the LED 2. Because the main portion 33 forms an elliptic shape with the direction perpendicular to the light emitting direction as a long axis, the main portion 33 will be referred to as the elliptic portion 33. However, the main portion 33 may not be elliptic but may be circular. Moreover, the emission-side protrusion 31 and the rear-side protrusion 32 each have a tapered shape that gradually narrows with the distance from the LED 2 or the elliptic portion 33.

In the embodiment, the elliptic portion 33, the emission-side protrusion 31, and the rear-side protrusion 32 are connected to each other and integrated. Moreover, the dimming pattern 3 has an optical effect to reflect a part of light incident upon the dimming pattern 3 and cause a part thereof to transmit therethrough as described later, thereby reducing the intensity of light passing through the dimming pattern 3. The transmittance of the dimming pattern 3 is set to approximately 5% to 10% and the reflectance is set to 80% to 90%, for example.

As described above, the LED 2 is provided in the groove portion 101, and light exiting from the LED 2 is incident upon the light incident surface 102 of the light guide plate 1, and travels inside the light guide plate 1. Here, as the LED 2, the side view type LED is used as described above, however, even with the side view type LED, light transmits through the upper side of a package constituting the contour of the LED and travels toward directly above the LED 2. Moreover, the light reflected by the light incident surface 102 of the groove portion 101 travels toward directly above the LED 2. With such light, at the portion directly above the LED 2 of the light emitting surface 110 of the light guide plate 1, the light intensity locally increases as compared with in other portions. Hereinafter, this portion where the light intensity locally increases is referred to as an "optical spot." Because the light from the LED 2 radially spreads toward the light emitting direction, the optical spot will also have a radially spreading shape.

Then, in the embodiment, in the light incident surface 102 of the light guide plate 1, the dimming pattern 3 comprises a combination of the elliptic portion 33 particularly covering the portion directly above the LED 2 where the optical spot is generated, and the emission-side protrusion 31 radially extending toward the light emitting direction. Thus, the intensity of light emitted from the light incident surface 102 toward directly above the LED 2 and the intensity of light radially spreading toward the light emitting direction therefrom are weakened to reduce the brightness of the optical spot.

Moreover, because light turns around also to the rear side (the opposite side of the light emitting surface) of the LED 2, the optical spot slightly radially spreads also in the rear-surface direction of the LED 2. Therefore, in the embodiment, by further providing the radial rear-side protrusion 32 extending to the rear side of the LED 2 as the dimming pattern 3, the light intensity of the rear side portion of the LED 2 in the light incident surface 102 of the light guide plate 1 can be weakened.

That is, the embodiment reduces the optical spot and suitably suppresses the uneven brightness by using the dimming pattern 3 with a shape taking into consideration the light emission characteristic of the LED 2. Hereinafter, the detail of the optical effect of the dimming pattern 3 is described.

In the elliptic portion 33 in the center of the dimming pattern 3, the light emitted from the LED 2 is dimmed and reflected. In the vicinity of the neighboring radial emission-side protrusion 31, in a portion where the protrusion is formed, light emitted from the LED 2 is dimmed and reflected as with the above-described elliptic portion, while in the space between the protrusions, i.e., a portion where the protrusion is not formed, corresponding to the valley between the protrusions, the light from the LED 2 is transmitted therethrough and emitted to the outside of the light guide plate 1. That is, in the vicinity of the radial emission-side protrusion 31, a different optical effect of extinction/reflection/transmission is provided depending on each location, and the quantity of light emitted from the light guide plate 1 as a whole is gradually varied and controlled by the shape of the emission-side protrusion 31. Moreover, for the portion of the light that is emitted from the LED 2 and turns around and travels to the rear side, a different optical effect of extinction/reflection/transmission is provided depending on each location by means of the radial rear-side protrusion 32, as by the above-described emission-side protrusion 31, thereby gradually varying the quantity of light emitted from the light guide plate 1. Here, because the emission-side protrusion 31 is formed longer than the rear-side protrusion 32, the range in which the optical effect of the above-described extinction/reflection/transmission is provided is larger in the emission-side protrusion 31 (that is, on the light emitting direction side of the LED 2).

(A) of FIG. 1 is a cross sectional view for illustrating the above-described optical effect around the LED 2. Here, for example, an optical effect provided to a light beam 58 is described. The light beam 58 travels inside the light guide plate 1, and is reflected by or transmits through the dimming pattern 3, and splits into a light beam 60 that has dimmed and transmitted therethrough and a light beam 59 that has been reflected. Furthermore, the light beam 59 is totally reflected on the reflective surface 111 side of the light guide plate 1 because the incident angle with respect to the reflective surface 111 is equal to or less than a critical angle, and travels inside the light guide plate 1 as shown by a light beam 61, and is further totally reflected by the light emitting surface 110, and travels inside the light guide plate 1 as shown by a light beam 84, and then travels to the outside of the light guide plate 1 from the light emitting surface 110 at a non-illustrated location.

In the case of a light beam 62 whose angle of emergence with respect to the optical axis is smaller than the light beam 51, the light beam 62 travels to a location ahead of a location where the dimming pattern 3 of the light emitting surface 110 of the light guide plate 1 is formed. The light beam 62 strikes against the emission-surface side light guide pattern 41 provided on the light emitting surface 110. At this time, a part of the light transmits through the light emitting surface 110 (the emission-surface side light guide pattern 41) without being totally reflected, and exits while spreading as shown by a light beam 63. The incident angle of a part of the remaining light becomes equal to or less than the critical angle, and this light is reflected while diffusing, and a part thereof travels further inside the light guide plate 1 as shown by a light beam 64 and then travels from the light emitting surface 110 to the outside of the light guide plate 1 at a non-illustrated location.

As described above, an emission light quantity adjusting member on the light emitting surface 110 side comprises the emission-surface side light guide pattern 41 and the dimming pattern 3 on the light emitting surface 110 side.

Next, an optical effect of the reflective-surface side light guide pattern 44 formed in the reflective surface 111 is described using (b) of FIG. 1. For example, a light beam 68 travels inside the light guide plate 1, and strikes against the reflective-surface side light guide pattern 44 formed in the reflective surface 111. At this interface, the light beam 68 does not meet the total internal reflection condition, and is thus diffused by a dot portion of the reflective-surface side light guide pattern 44, and travels while scattering inside the light guide plate 1 and in the vicinity of the reflective sheet 920 as shown by a light beam 82. The light having traveled to the reflective sheet 920 is reflected and returns again to the light guide plate 1, and is emitted from the light emitting surface 110 to the outside of the light guide plate 1.

On the other hand, a light beam 69 whose angle of emergence with respect to the optical axis is smaller than the light beam 68 travels inside the light guide plate 1 and reaches the reflective surface 111. Here, because the incident angle to the reflective surface 111 of the light beam 69 is equal to or less than the critical angle, the light beam 69 is totally reflected by the reflective surface 111, and travels inside the light guide plate 1 as shown by a light beam 80 and reaches the light emitting surface 110. Also here, because the incident angle to the light emitting surface 110 of the light beam 80 is equal to or less than the critical angle, the light beam 80 is totally reflected by the light emitting surface 110, and travels inside the light guide plate 1 as shown by a light beam 81, and is diffused by a dot portion of the reflective-surface side light guide pattern 44 in the reflective surface 111, and then travels while scattering inside the light guide plate 1 and in the vicinity of the reflective sheet 920 as shown by a light beam 83. The light having traveled to the reflective sheet 920 is reflected and returns again to the light guide plate 1, and is emitted from the light emitting surface 110 to the outside of the light guide plate 1. In this manner, by means of the dimming pattern 3 provided on the light emitting surface 110 and the reflective surface 111 of the light guide plate 1, the emission-surface side light guide pattern 41, the reflective-surface side light guide pattern 44, and the like, light can be uniformly extracted from the light guide plate 1.

Next, an inter-LED uniforming pattern 43 is described with reference to FIG. 8. As illustrated in (a) of FIG. 8, in the light emitting surface 110, the inter-LED uniforming pattern 43 that is a part of the light guide pattern 4 and the dimming pattern 3 are provided. The dimming pattern 3 is arranged so as to correspond to the location of each of a plurality of LEDs 2 (two LEDs in the view), and further, the in-LED uniformizing pattern 43 is provided 2 between the LEDs.

Figure 8:
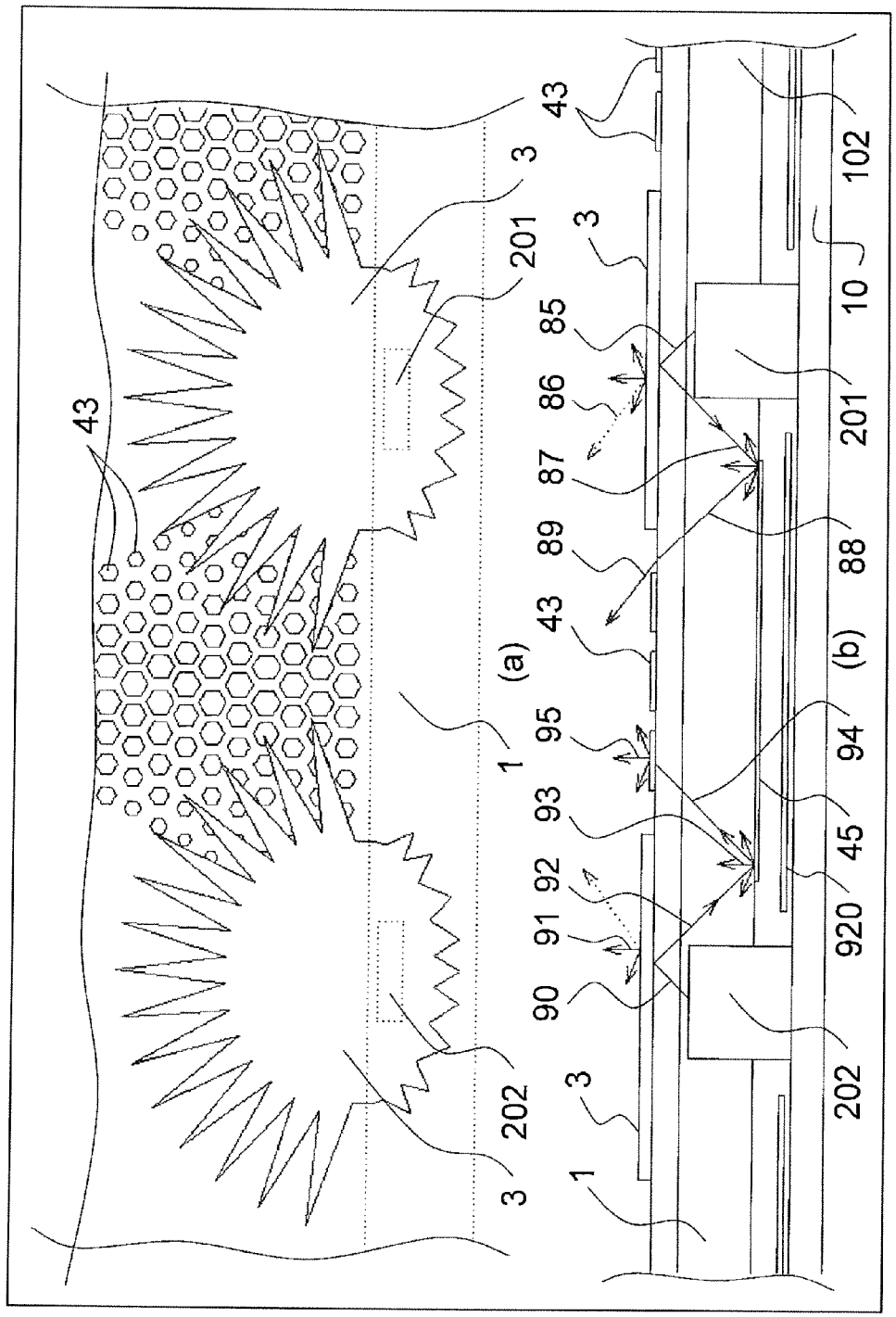
FIG. 8 is a view illustrating an example of the dimming pattern according to the first embodiment of the present invention.

The optical effects of the above-described inter-LED uniforming pattern 43 and dimming pattern 3 and the reflective-surface side inter-LED light guide pattern 45 illustrated in (b) of FIG. 7 are described with reference to (b) of FIG. 8 illustrating a cross sectional side view of (a) of FIG. 8.

Among light exiting from an LED 201 (an LED on the right side of the view) attached onto the illumination board 10, a light beam 85 traveling obliquely upward enters into the light guide plate 1 via the light incident surface 102, and strikes against the dimming pattern 3 formed on the light emitting surface 110, and here the light beam 85 dims and transmits therethrough and scatters, and then exits to the outside of the light guide plate 1 as shown by a light beam 86. Moreover, the light reflected by the dimming pattern 3 travels to the reflective surface 111 as a light beam 87, and a part thereof is diffused and reflected by the reflective-surface side inter-LED light guide pattern 45 (the same as the reflective-surface side inter-LED light guide pattern 45 described in FIG. 7) provided here, and travels inside the light guide plate 1 as shown by a light beam 88. Moreover, a part of the remaining light transmits through the reflective-surface side inter-LED light guide pattern 45, and is diffused and reflected by the reflective sheet 920, and travels toward the light guide plate 1 and returns into the light guide plate 1. On the other hand, the light beam 88 transmits through and exits the light emitting surface 110, and travels to the outside of the light guide plate 1 as a light beam 89.

On the other hand, among light exiting from an LED 202 (an LED on the left side of the view) attached onto the illumination board 10, a light beam 90 traveling obliquely upward enters into the light guide plate 1 via the light incident surface 102, and strikes against the dimming pattern 3 formed on the light emitting surface 110, and here the light beam 90 dims and transmits therethrough and scatters, and exits to the outside of the light guide plate 1 as shown by a light beam 91. Moreover, the light reflected by the dimming pattern 3 travels to the reflective surface 111 as a light beam 92, and a part thereof is diffused and reflected by the reflective-surface side inter-LED light guide pattern 45 provided here, and then travels inside the light guide plate 1 as shown by a light beam 94. Moreover, a part of the remaining light transmits through the reflective-surface side inter-LED light guide pattern 45, and is diffused and reflected by the reflective sheet 920 and travels toward light guide plate 1, and then returns into the light guide plate 1. On the other hand, the light beam 94 transmits through while being diffused by the inter-LED uniforming pattern 43 provided on the light emitting surface 110, and travels to the outside of the light guide plate 1 as a light beam 95.

In this manner, a part of the dimming pattern 3, the inter-LED uniforming pattern 43, and the reflective-surface side inter-LED light guide pattern 45 are used also in a portion between LEDs where light does not reach or the quantity of arriving light is small, a sufficient quantity of light can be extracted from the light emitting surface 110 of the light guide plate 1, and the generation of such uneven brightness that a portion between the LEDs becomes locally dark can be prevented.

As described above, according to the embodiment, the uneven brightness can be suitably reduced. In particular when an illumination unit is divided into a plurality of regions, the above-described uneven brightness that the brightness becomes locally dark is generated because a portion between the regions is the portion between the LEDs, but the uneven brightness between the regions (between the LEDs) can be reduced in a manner described above. Moreover, even when a plurality of LEDs are arranged with a predetermined spacing from each other within a region, the uneven brightness between LEDs can be reduced similarly, and thus the uneven brightness within the region can be also reduced. Furthermore, because the dimming pattern 3 with the shape as described above is formed in a portion directly above the LED of the light emitting surface 110, the reduction of an optical spot (uneven brightness) suitable for the light emission characteristic of the LED can be carried out.

Thus, according to the embodiment, an illumination unit reducing the uneven brightness between regions and the uneven brightness within a region can be provided. Furthermore, in a display apparatus applying this illumination apparatus, a high-quality image with a uniform brightness can be displayed.

Embodiment 2

Figure 9:
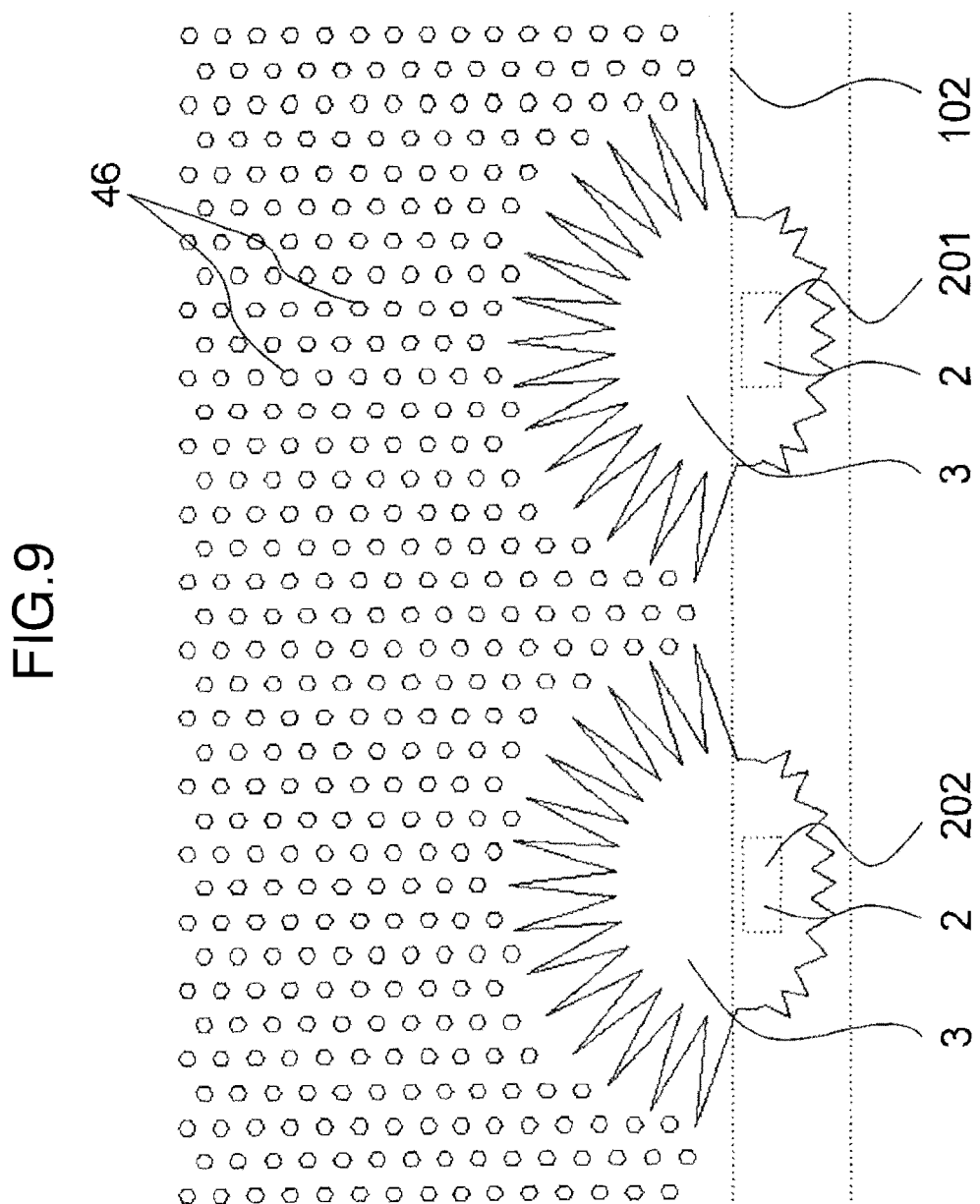
FIG. 9 is a view illustrating an example of the light guide pattern and the dimming pattern formed on the light emitting surface of the light guide plate according to the first embodiment of the present invention.

Next, a second embodiment of the present invention is described with reference to FIG. 9. In the above-described first embodiment, as shown in FIG. 7, as the light guide pattern 4 on the light emitting surface 110 side, the emission-surface side light guide pattern 41 and the inter-LED uniforming pattern 43 are spaced apart by a predetermined distance, while in the embodiment, the inter-LED uniforming pattern 43 and the emission-surface side light guide pattern 41 are integrated into an emission-surface side light guide pattern 46.

At this time, the reflective-surface side light guide pattern 44 is provided also on the non-illustrated reflective surface 111 side and is integrated with the reflective-surface side inter-LED light guide pattern 45. According to such configuration, in the reflective-surface side light guide pattern, i.e., the light guide plate 1 according to the embodiment, three patterns of the dimming pattern 3, the emission-surface side light guide pattern 46, and the reflective-surface side light guide pattern are provided as a pattern.

In this manner, a sufficient quantity of light can be extracted from the light emitting surface 110 of the light guide plate 1, and the generation of such uneven brightness that a portion between the LEDs becomes locally dark can be prevented.

Embodiment 3

Next, a third embodiment of the present invention is described with reference to FIG. 10. As illustrated in (a) of FIG. 10, a dimming pattern 304 and a light guide pattern 400 are provided in the light emitting surface 110 of the light guide plate 1. Moreover, the light guide pattern 400 comprises a multiple-stages of light guide pattern, e.g., a first stage emission-surface side light guide pattern 47, a third stage emission-surface side light guide pattern 48, a fifth stage emission-surface side light guide pattern 49, and so on. In the light guide pattern in each stage, the thickness of the ink formed is varied. Here, among the rows of pattern (group of dots) arranged in the lateral direction of the plane of the view, a row closest to the LED is the first stage, and as the distance from the LED increases, the number of the stage increments such as the second stage, the third stage . . . and so on.

Figure 10:
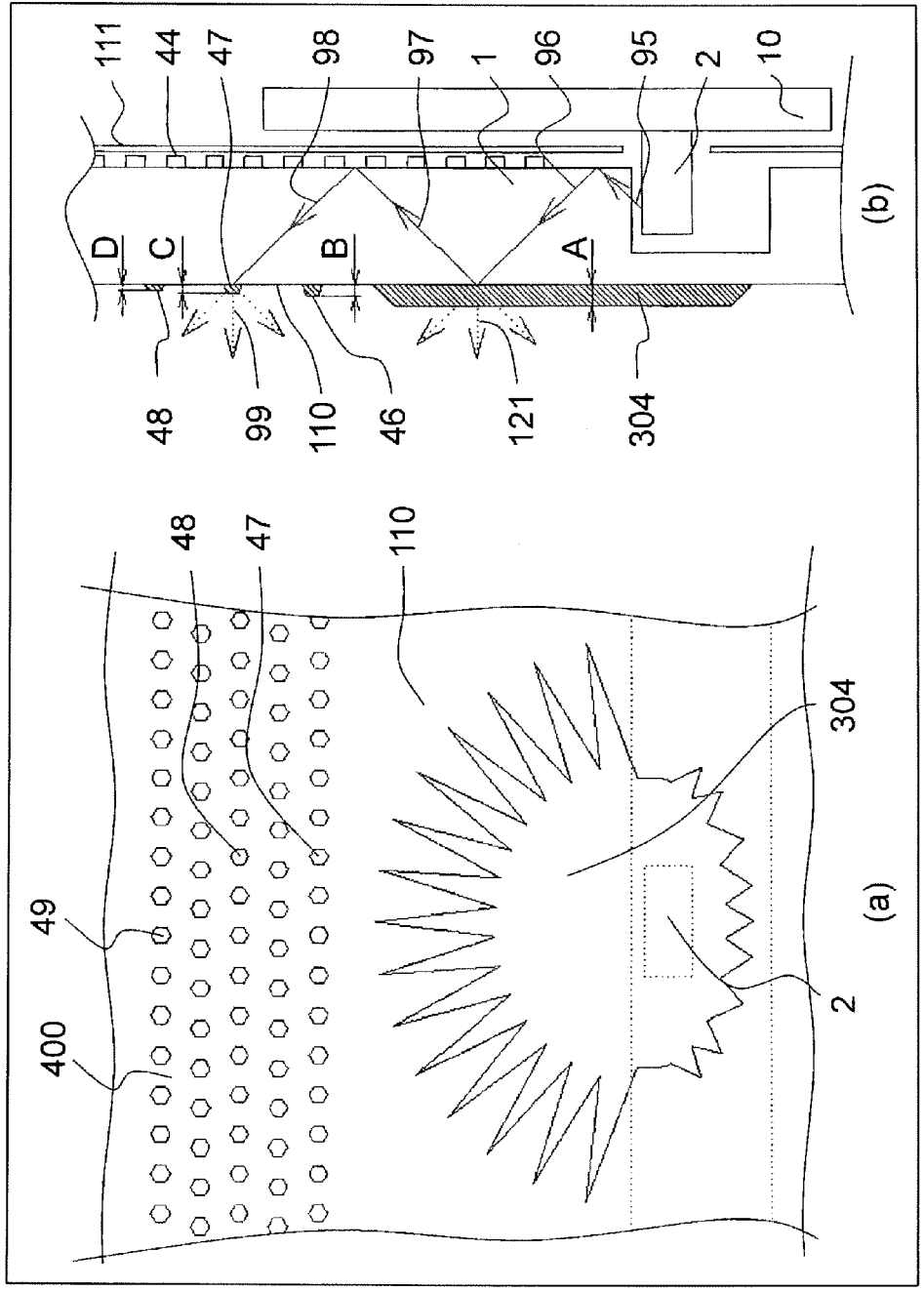
FIG. 10 is a view illustrating a second embodiment of the present invention.

(B) of FIG. 10 illustrates a cross sectional view of (a) of FIG. 10. The reflective-surface side light guide pattern 44 is provided also on the reflective surface 111 side, and accordingly three patterns of the dimming pattern 304, the light guide pattern 400, and the reflective-surface side light guide pattern 44 are provided in the light guide plate 1. Furthermore, in the embodiment, the light guide pattern 400 on the light emitting surface 110 side comprises a combination of light guide patterns with a plurality of thicknesses. For example, the first stage emission-surface side light guide pattern 47 has a thickness B, the third stage emission-surface side light guide pattern 48 has a thickness C, and the fifth stage emission-surface side light guide pattern 49 has a thickness D. Furthermore, the thickness of the dimming pattern 304 is set to a thickness A, and the thicknesses of these patterns are set in a descending order as A>B>C>D in this view.

A difference in the thickness between the first stage emission-surface side light guide pattern 47 and the third stage emission-surface side light guide pattern 48 can be realized by a printing method of changing the thickness of the ink for each dot, such as gravure printing, or by ink jet printing, or the like.

Here, the optical operations by these light guide patterns are described with the light beam 95 emitted from the LED 2 taken as an example.

The light beam 95 emitted from the LED 2 travels inside the light guide plate 1, and is totally reflected on the reflective surface 111 side and travels to the dimming pattern 304 as a light beam 96. Here, a part of the light dims and transmits therethrough, and travels to the outside of the light guide plate 1 while being diffused as shown by a light beam 121. On the other hand, a reflected light beam 97 travels to the reflective surface 111 again and is totally reflected, and then travels to the light emitting surface 110 as shown by a light beam 98, and here strikes against a dot with a predetermined thickness of the third stage emission-surface side light guide pattern 48. Here, the light beam dims and transmits therethrough and then travels to the outside of the light guide plate 1 while being diffused as shown by a light beam 99.

Then, for example, as with the third stage emission-surface side light guide pattern 48, the quantity of light diffused and emitted from the light guide pattern can be adjusted by the thickness of the pattern (dot). For example, the thickness of the emission-surface side light guide pattern at a location where a large quantity of light is desired to be emitted is made thick, while the thickness of the emission-surface side light guide pattern at a location where the quantity of emitted light is desired to be reduced is made thin. That is, in the embodiment, the quantity of light is controlled not by the shape of the emission-surface side light guide pattern but just by the thickness.

Thus, in the light emitting surface 110 of the light guide plate 1, with the use of dots for the emission-surface side light guide pattern with the same shape and size, the light quantity can be adjusted corresponding to a location in the light emitting surface 110.

Embodiment 4

Figure 11:
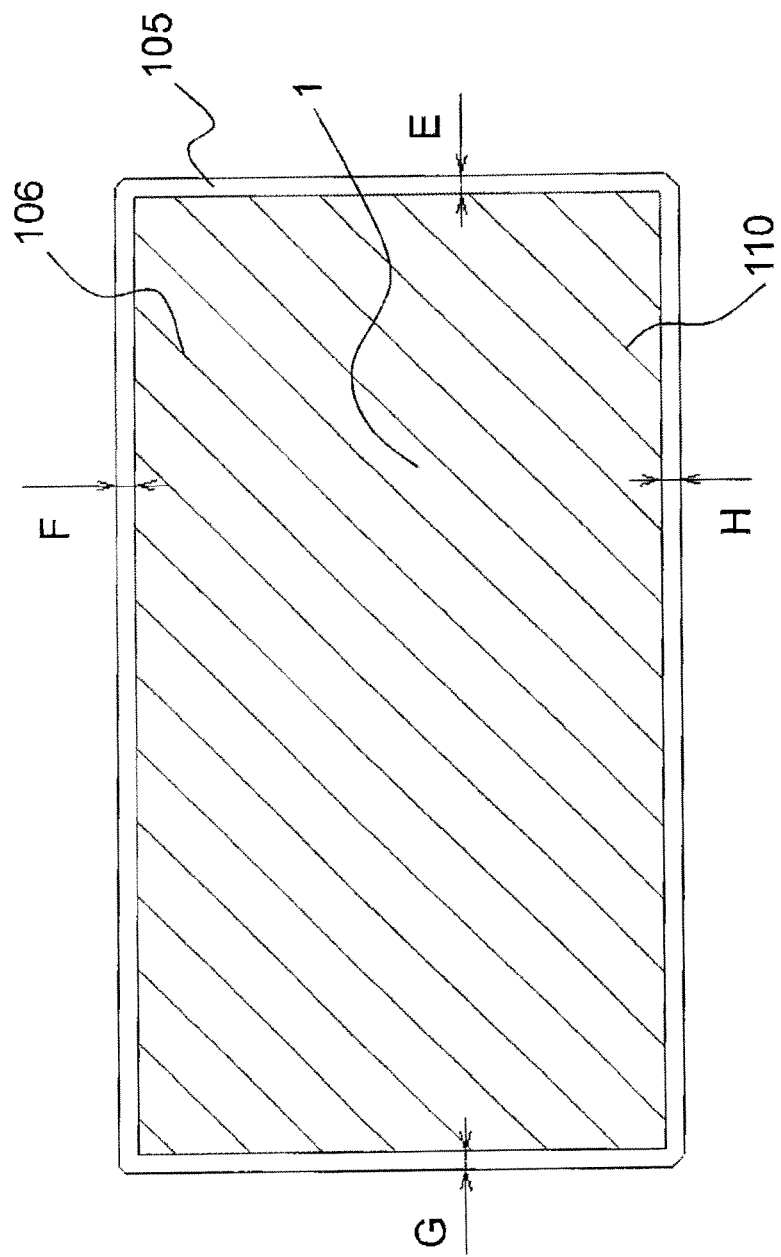
FIG. 11 is a view illustrating a third embodiment of the present invention.

Next, a fourth embodiment of the present invention is described with reference to FIG. 11. FIG. 11 illustrates a printing area 106 for the dimming pattern and the light guide pattern provided in the light emitting surface 110 of the light guide plate 1, and the outer shape of the light guide plate 1.

The printing area 106 is spaced apart with a predetermined distance from the outer peripheral sides (edges) of the light guide plate 1. At this time, distances E, F, G, and H from the sides of the light guide plate 1 to the sides of the printing area 106 in parallel thereto are approximately 10 mm, for example. That is, the printing area 106 is printed with a distance of 10 mm or a distance greater than 10 mm apart from the side of the light guide plate 1.

Even in this manner, as the function of the light guide plate 1, the problem such as a reduction in the quantity of light in the peripheral portion of the light guide plate 1 is small. On the contrary, if the pattern is not printed in the peripheral portion of the light guide plate 1, then the peripheral portion of the light guide plate 1 can be utilized as a grasping or holding region. Therefore, the falling-off or the like of the printed portion in grasping or holding the light guide plate 1 due to the fact that the pattern is printed over the entire surface including the peripheral portion of the light guide plate 1 can be prevented. That is, with such an arrangement, the problem in handling the light guide plate 1 can be resolved.

As described in the embodiments, according to the embodiments, the light emitted from the light guide plate in the vicinity of an LED can be uniformed. That is, according to the embodiment, a stable performance illumination unit and display apparatus with a reduced uneven brightness can be provided, and accordingly a stable performance display apparatus can be provided. In the description of the embodiments, as the method of forming the dimming pattern or the light guide pattern provided in the light guide plate, a method by printing, coating, or the like has been described. However, it is needless to say that even with other method, such as ink-jet printing, flexo printing, heat-transfer printing, or the pattern formation using an electrostatic adsorption method (the so-called electrophotographic method), the same effect can be obtained.

Moreover, the length of the protrusion in the emission-side protrusion and in the rear-side protrusion, respectively, is the same in one dimming pattern but may differ. For example, the smaller the angle between the optical axis of an LED and the emission-side protrusion, the longer the length of the protrusion may be set, while the larger the angle between the optical axis of an LED and the emission-side protrusion, the shorter the length of the protrusion may be set.

In the description of the embodiments, the LED has been described with the so-called "side view type LED" taken as an example, however, it is needless to say that even a top view type LED (with an upward emission configuration) can be similarly constructed and the same effect can be obtained.

The invention claimed is:

1. An illumination unit, comprising a light emitting element as a light source and a tabular light guide plate having a light emitting surface for emitting light from the light source as planar light, wherein a recessed portion is formed in an opposite surface of the light emitting surface of the light guide plate, and the light emitting element is provided in the recessed portion so that an optical axis of the light emitting element becomes parallel to the light emitting surface of the light guide plate;
   wherein a dimming pattern is provided on the fight emitting surface of the light guide plate at a portion positionally corresponding to the tight emitting element;
   wherein a first light guide pattern is provided on the light emitting surface of the light guide plate; and
   wherein a second light guide pattern is provided on a rear surface of the light guide plate.

2. The illumination unit according to claim 1, wherein the light emitting element is an LED.

3. The illumination unit according to claim 1, wherein the dimming pattern is formed by printing.

4. The illumination unit according to claim 1, wherein a plurality of the light emitting elements are arranged along a longer direction of the recessed portion, and wherein a third light guide pattern is formed between the light emitting elements on the light emitting surface of the light guide plate.

5. The illumination unit according to claim 4, wherein the first light guide pattern and the third light guide pattern are integrally formed on the light emitting surface of the light guide plate.

6. The illumination unit according to claim 1, wherein a plurality of the light emitting elements are arranged along a longer affection of the recessed portion, and wherein a fourth light guide pattern is formed between the light emitting elements on the rear surface of the light guide plate.

7. The illumination unit according to claim 5, wherein the second light guide pattern and the fourth light guide pattern are integrally formed on the rear surface of the light guide plate.

8. The illumination unit according to claim 1, wherein thicknesses of the dimming pattern and the first light guide pattern provided on the light emitting surface of the light guide plate are different from each other.

9. The illumination unit according to claim 8, wherein the first light wide pattern comprises a plurality of dots with different thicknesses.

10. The illumination unit according to claim 1, wherein a print range of the light guide pattern provided in the light guide plate is set within 10 mm or more from an outer periphery of the light guide plate.

11. A display apparatus using the illumination unit according to claim 1 as a back light.

* * * * *